Patented Mar. 11, 1941

2,234,211

UNITED STATES PATENT OFFICE 2,234,211

STABILIZED PLASTIC CHLOROPRENE POLYMER AND PROCESS OF PRODUCING SAME

Herbert W. Walker, Woodstown, N. J., assignor to E. I. du Pont de Nemours & Company, Wilmington, Del., a corporation of Delaware No Drawing. Application December 14, 1938, Serial No. 245,595

8 Claims. (Cl. 260—89)

This invention relates to the treatment of plastic polymers of halogen-2-butadienes-1,3 and their homologues. More specifically it relates to the treatment of plastic polymers of chloro-2-butadiene-1,3 (hereinafter, for convenience, referred to as chloroprene). More particularly, it relates to stabilization of the plastic polymers of these halogen dienes. This application is a continuation-in-part of copending application Serial No. 69,740, filed March 19, 1936.

Heat curable plastic polymers of chloroprene (that is, plastic polymers of chloroprene which are readily converted simply by the action of heat into the strong elastic state resembling vulcanized rubber) and particularly those made in emulsion in the presence of certain modifying agents as disclosed, for example, in the copending applications of Starkweather, filed March 19, 1936, and given Serial No. 69,739; Starkweather & Collins, filed March 19, 1936, and given Serial No. 69,737; and Starkweather & Collins, filed March 19, 1936, and given Serial No. 69,738, are soft and plastic when first isolated and lend themselves readily to the common operations of rubber technology such as milling, calendering and tubing. On standing at ordinary temperatures or sometimes when allowed to warm during milling, these polymers have a tendency to lose their plasticity and become tough and elastic, even in the presence of antioxidants, such as phenyl beta naphthylamine. Thus, on storage under ordinary conditions they show a decided tendency to lose their plasticity within periods as short as three months and at temperatures of about 70° C. they exhibit this decided tendency within 24 hours. It thus becomes very difficult or impossible to handle them with ordinary rubber machinery and hence their use is limited.

It is therefore an object of this invention to maintain in the plastic condition during milling and storage heat curable plastic polymers of halogen-2-butadienes-1,3 and their homologues in which the hydrogen atom on carbon atom 3 is replaced by a hydrocarbon group. A more specific object is to maintain heat curable plastic polymers of chloroprene in the plastic condition during milling and on storage for periods much longer than 3 months under ordinary conditions. A still further object is to provide means for maintaining the plasticity of these polymers, which means, however, does not substantially reduce their capacity to be converted under curing conditions to the strong elastic state resembling vulcanized rubber. Other objects will appear hereinafter.

With these objects in mind it has now been discovered that the plasticity of heat curable plastic polymers of halogen-2-butadienes-1,3 and their homologues of the general formula

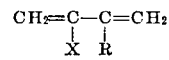

in which X is halogen and R is hydrogen or a hydrocarbon radical may be retained within desired limits during storage for long periods of time and also under milling conditions without, however, substantially reducing their capacity to be converted under curing conditions to the strong elastic state resembling vulcanized rubber, by having present with them relatively small amounts of certain compounds hereinafter referred to as "stabilizers," such as aromatic mercaptans or mercapto compounds containing aromatic groups or such as ammonium salts, the use of which for this purpose is specifically claimed in a copending application of Starkweather and Collins, Serial No. 196,186, filed March 16, 1938. It has further been found that this invention is particularly applicable to heat curable chloroprene plastic polymers, especially those prepared as described in the copending applications, identified above.

The following examples are included in order to more fully illustrate the invention, and it should be understood that these examples are given for this purpose alone, and that accordingly they are not to be construed as limiting the scope of the invention.

In these examples and throughout this application, whenever the term "plasticity number" is used, it refers to the thickness in thousandths of an inch of a 2.5 c.c. sample of the polymer in the form of a cylinder 5/8" in diameter which has been heated to 80° C. for 15 minutes and then kept under a weight of 5 kilograms for three minutes at 80° C. It will be obvious that the plasticity will vary inversely as the plasticity number, lower plasticity numbers indicating more plastic materials. It has been found that to be milled satisfactorily a polymer should, in general, have a plasticity number less than 125.

The term "regain" is also used in this application and wherever it occurs herein refers to the gain in thickness in thousandths of an inch of the compressed sample, from the plasticity test, when freed from pressure for one minute at room temperature. For satisfactory milling this "regain" should, in general, be less than 25.

In addition, it should be noted that wherever, throughout these examples, the term "parts" is used, it refers to "parts by weight."

Example 1

A plastic polymer of chloroprene was prepared according to the method disclosed in a copending application of Starkweather and Collins, Serial No. 69,738, filed March 19, 1936, by polymerizing chloroprene in acid aqueous emulsion in the presence of 0.75% of thioglycolic acid and 0.06% of hydrogen sulfide (both based on the amount of chloroprene used). The dried, finished polymer containing no stabilizer or anti-oxidant was divided into 2 portions, one of which was treated with 1% of phenyl beta naphthylamine by incorporation on a rubber mill and was retained as a control. The other portion was treated with 1% of phenyl beta naphthylamine and 2% of thiophenol on a rubber mill. The plasticity numbers and regain of both samples were determined at once and after aging for 24 and 48 hours in an air oven at 70° C. The following table gives the plasticity data thus obtained for polymer treated and untreated with thiophenol and also with several other substances coming within the scope of this invention. In each case 2% of the aromatic mercaptan is used.

| Polymer No. | Agent added in addition to phenyl beta-naphthylamine | Plasticity number and regain after aging at 70° C. for— | | |
|---|---|---|---|---|
| | | 0 hrs. | 24 hrs. | 48 hrs. |
| 1 | None (control) | 77–2 | 127–45 | 139–63 |
| 1 | Thiophenol | 63–2 | 67–1 | 70–1 |
| 1 | Thio-beta-naphthol | 66–2 | 78–0 | 80–1 |
| 1 | o-Thiocresol | 65–1 | 77–2 | 79–2 |
| 2 | None (control) | 102–9 | 184–150 | 202–178 |
| 2 | Thio-alpha-naphthol | 77–5 | 103–7 | 109–9 |
| 3 | None (control) | 77–3 | 150–90 | |
| 3 | p-Nitro thiophenol | 69–1 | 99–3 | 102–6 |
| 4 | None (control) | 87–1 | 124–7 | 136–3 |
| 4 | Benzyl mercaptan | 68–2 | 100–3 | 102–3 |

It will be seen from inspection of this table that all the mercaptans added have a very pronounced effect in reducing the change in plasticity on aging at 70° C. A similar improvement over untreated polymer exists as regards the change of plasticity at room temperature, the test at 70° C. being used because it gives in a few days data on change in plasticity which require months to obtain at ordinary temperature.

Example 2

One hundred parts by weight of chloroprene were polymerized in the presence of thioglycolic acid and hydrogen sulfide as described in Example 1. When about 80% of the chloroprene had polymerized, a dispersion of one part by weight of phenyl beta naphthylamine and 2 parts by weight of para nitro thiophenol dissolved in 10 parts by weight of benzene and dispersed in 15 parts by weight of a 1% solution of stearyl sodium sulfate was added. The resulting mixed dispersion was treated with solid sodium chloride and the coagulated stabilized polymer was washed and dried as described in the copending application mentioned in Example 1. The product had a stability similar to that of the stabilized product of Example 1, and when 100 parts of this product were compounded with 5 parts of zinc oxide, 10 parts of magnesium oxide, and 5 parts of rosin and cured at 130° C., a highly elastic rubber-like product of good tensile strength was obtained.

Other representatives of this general class of compounds than those given in the examples will be found to be operative. For example, we may use such compounds as:

m-Thiocresol
p-Thiocresol
o-Nitro thiophenol
m-Nitro thiophenol
Dinitro thiophenols
Nitro thiocresols
p-Mercapto diphenyl
o-Mercapto diphenyl
1-mercapto anthracene
2-mercapto anthracene
Chloro thiophenols
Dichloro thiophenols
Chloro nitro thiophenols
Di-bromo thiophenols
Tri chloro thiophenols
Thiophenol sodium sulfonates
Mercapto diphenyl potassium sulfonates
Mercapto anthracene sulfonic acids
Iodo thio cresols
Di nitro thio naphthols
Nitro benzyl mercaptans
Chloro-b-phenyl ethyl mercaptans
Thio xylenols As illustrated by the above examples, the invention may be applied to the stabilization in the plastic state of heat curable plastic polymers, generally of halogen-2-butadienes-1,3 and their homologues corresponding to the following general formula:

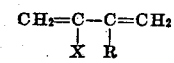

in which X is halogen and R is hydrogen or a hydrocarbon radical; for examples, bromo-2-butadiene-1,3 and chloro-2-methyl-3-butadiene-1,3. When a mercaptan is incorporated into such polymers as illustrated above the chloroprene polymers, it has been found that it exerts a definite effect by way of maintaining the plasticity of the polymer, i. e., "stabilizing" it as that term is used herein.

As is apparent from the above disclosure, many aromatic mercaptans are useful in the present invention. The common functional part of these compounds is the —SH group. The other substituents are used to transform certain of the mercaptans that are slightly volatile and have strong objectionable odors into practically non-volatile compounds in which the odor is practically eliminated or greatly reduced. For example, thiophenol imparts considerable odor to polymer treated with it, whereas the para nitro thiophenol is practically odorless at room temperature and gives no noticeable odor to polymer in which it is used. Other hydrocarbon substituents than methyl may also be present in the aryl groups or the mercapto group may be present in an aliphatic substituent of the aromatic group. It is also within the scope of the present invention to add to the polymers materials which under the conditions prevailing in the polymer to which they are added, will generate a mercaptan as described herein.

For the purposes of this invention, the aromatic ring should not contain, however, any substituents such as the following which appear to have an adverse effect: —COOH, —NH$_2$, a second —SH, —OH, or alkoxy group. The resulting mercaptan compounds are either inactive or else they accelerate the change from the plastic to the elastic condition under conditions of storage and milling.

Generally, therefore, it may be said that any mercaptan of the general formula: Q—SH, in which the —SH group is attached directly to one of the carbon atoms in the Q group and in which Q is an organic group selected from the class consisting of aryl groups and aralkyl groups, which aryl groups and aralkyl groups consist of carbon and inorganic radicals selected from the class consisting of —H, —Cl, —Br, —I, —NO₂, and —SO₃M, in which M is an inorganic radical of the group consisting of hydrogen and alkali metals, may be used in the process of this invention.

The amounts of such agents which have been used with success in the polymers vary from about 0.1% to about 5.0% or more. With lower concentrations, up to about 1% in the case of the stabilizing agents of lower molecular weight, the effectiveness of the compound increases with the amount of material present, but the increase rapidly falls off with higher concentrations. An excess of stabilizing agent appears to remain as inert material. Preferably, therefore, about 1% to 2%, based on the polymer, of the lower molecular weight stabilizing agents should be present. In the case of the stabilizing agents of higher molecular weight, larger proportions may be necessary to produce similar effects.

For the purpose of this invention these stabilizing agents may be added to the polymer at any time after the polymerization process has been carried to the point desired, in amounts such that the total amount of stabilizer present after the addition is, at least, that amount which will produce a definite stabilizing effect, i. e., about 0.1% to about 5% based on the weight of the polymer, as disclosed above. It should also be understood that mixtures of two or more of the stabilizing agents, disclosed herein, may be used and that where two or more stabilizing agents are used their effects are, in general, additive, i. e., if one is present and another is added, it will increase the stabilizing effect. It is also possible to use a stabilizer of another class in combination with an aromatic mercaptan of the type disclosed herein. Such a combination, using a substituted ammonium salt (the use of which is broadly disclosed in a copending application of Starkweather and Collins, filed March 16, 1938, and given Serial No. 196,186) with an aromatic mercaptan is further discussed hereinafter. It will be obvious, of course, that two stabilizers either of which exerts a destructive effect on the other, can not be used together to advantage.

This method of stabilizing may be applied to any type of heat curable plastic polymer of chloroprene. Thus, instead of the modified emulsion polymer of the type used above, a polymer, for example, made by the method described in U. S. Patent No. 1,950,436 may be used. Such a polymer, to which 1% of phenyl beta naphthylamine only was added, changed in plasticity number and regain during two days in the accelerated aging test at 70° from 77 and 3 to 117 and 10. Another portion, stabilized with 1% of ortho thiocresol, in addition to the phenyl beta naphthylamine, changed from 68-4 to 94-6 under the same conditions of aging.

The invention is particularly applicable to the heat curable plastic polymers produced by the process of the following copending applications: Starkweather, Serial No. 69,739, filed March 19, 1936, which discloses emulsion polymerization of chloroprene in the presence of sulfur dioxide as a modifying agent; Starkweather and Collins, Serial No. 69,737, filed March 19, 1936, which has now matured into U. S. Patent No. 2,163,250, granted June 20, 1939, which discloses emulsion polymerization of chloroprene in the presence of hydrogen sulfide as a modifying agent; and Starkweather and Collins, Serial No. 69,738, filed March 19, 1936, and refiled July 30, 1937 as Serial No. 156,518 which discloses emulsion polymerization of chloroprene in the presence of organic modifying agents. The organic modifying agents which this latter case discloses are unpolymerizable acid-stable organic compounds which are capable of forming an addition product with compounds of the general formula

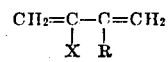

in which X is hydrogen and R is a member of the group consisting of hydrogen and hydrocarbon radicals under conditions of polymerization of such compounds of said general formula. This group of modifying agents includes the following classes of organic chemical compounds:

(1) Unsaturated compounds containing one or more carbonyl groups adjacent to the double bond;
(3) Aromatic sulfinic acids;
(3) Aromatic mercaptans;
(4) Mercapto-carboxylic acids;
(5) Aliphatic mercaptans.

On standing at ordinary temperatures, or sometimes when allowed to warm during milling, polymers made according to the above cases in the presence of the stated modifying agents have a tendency to lose their plasticity. The sulfur dioxide and hydrogen sulfide may be employed whether or not the monomer is dispensed in non-alkaline or acid emulsion. It is still more particularly applicable to the heat curable plastic polymers of chloroprene produced by polymerizing in acid aqueous emulsion according to the methods of these applications. The stabilization of these latter plastic polymers of chloroprene constitutes a definitely preferred modification of this invention.

It has been stated above that the stabilizing agents, disclosed herein, may be added to the polymer at any time after the polymerization process has been carried to the point desired. Thus, they may be added to the partially dried or dry polymer on the rubber mill. They may also be added to a water dispersion of polymerized chloroprene before coagulation.

In fact, a very efficient procedure illustrated in Example 2 involves the addition of these agents to dispersions of polymerized chloroprene resulting from polymerizing chloroprene in emulsion, particularly in the presence of modifying agents as disclosed in the copending applications, mentioned last above. Thus, a further preferred modification of this invention involves a variation of the modified polymerization processes disclosed in the applications above referred to, which comprises adding a stabilizer, as disclosed herein, to the dispersion of heat curable plastic polymer obtained by polymerizing in the presence of a modifying agent immediately after the polymerization has reached the desired point and prior to coagulation of the polymer.

It will be noted that as disclosed in this application and in another copending application of Walker, Serial No. 154,212, filed July 17, 1937, many of the organic modifying agents disclosed in the Starkweather and Collins application Serial No. 69,738, filed March 19, 1936, are also effective as stabilizing agents. It will also be noted that the long chain quanternary ammonium salts, disclosed as emulsifying agents for use in the emulsion polymerization of chloroprene, etc., in the presence of modifying agents are also effective stabilizing agents, as disclosed in the copending application of Starkweather and Collins, Serial No. 196,186, filed March 16, 1938. Certain of these modifying agents are, however, largely consumed during the polymerization under some conditions and the amounts of those emulsifying agents which are also stabilizing agents and which are present during the polymerization are frequently insufficient to produce the stabilizing effect desired in the finished polymer or else a portion of them is lost during some stage of the process. In general, therefore, even though there are present during the formation of a particular polymer some of the agents which are effective, both during the polymerization and as stabilizers, it may be desirable to add additional stabilizing agent to the polymer after the polymerization has reached the desired stage or at some later stage of the process in order to obtain the desired stabilizing effect in the final product.

According to the preferred process, outlined above, chloroprene is polymerized in an aqueous acid emulsion, in the presence of a modifying agent as disclosed in the copending applications, repeatedly referred to, until it has reached the desired stage of polymerization under the particular conditions used as indicated by previous tests, the nature of which is more fully set forth in the copending applications. At this point, the polymerization is arrested by adding to the dispersion about 1%, based on the polymer, of an antioxidant such as phenyl beta naphthylamine and a sufficient amount of an aromatic mercaptan as disclosed herein, to bring the amount of stabilizer present up to about 2%, based on the polymer, although the amount may be brought up to other amounts than 2%, as disclosed above. The polymer dispersion may be employed as such, as disclosed in the copending applications describing the modified polymerization, or the polymer may be isolated as a plastic mass as described in those applications. Of course, if the polymer is given any treatment following the addition or the adjustment of the amount of stabilizer desired, which results in a loss of an appreciable amount of the stabilizer, it should be replaced at a later stage of the process, preferably during the final milling step, that is, if the amount lost decreases the amount present below the desired content.

This latter method of operation, i. e., stabilization combined with modified polymerization, is particularly advantageous, in that the stabilizer is much more readily incorporated while the polymer is still in the emulsified state. Obviously, it is desirable to add the stabilizer as soon as is reasonably possible after the polymer has reached the desired stage of polymerization, since the function of the stabilizer is to retain the polymer in the state of plasticity in which it exists at the end of the polymerization.

It is also possible to effect the addition of the stabilizing agents disclosed herein by a continuous process as well as a batch process. This is conveniently accomplished by bringing together a stream of a dispersion of the polymer and a stream of a dispersion of the stabilizing agent in such a manner that they are thoroughly mixed. The amount of stabilizer added is obviously readily controlled by controlling the rates of flow of the two streams. It is, of course, clear that the stream comprising the polymer as well as that comprising the stabilizer need not be a colloidal dispersion. Solutions may, for example, be used. Obviously, however, whether one or both streams be a solution or a colloidal dispersion, means should be provided to mix them thoroughly, if thorough mixing does not otherwise take place.

Continuous emulsification combined with continuous polymerization and also combined with continuous addition of antioxidant is disclosed in the copending applications, identified above, which relate to modified polymerization and the combination of continuous stabilization as described herein with continuous production of polymer as described in those applications has been found to be very desirable. Thus, a stream of a dispersion of a stabilizing agent as disclosed herein is admitted into the pipe through which the dispersion of the polymer from the continuous polymerization is flowing, so that the two are thoroughly and continuously mixed. The amount of stabilizer added is readily controlled by varying the rate at which the dispersion of stabilizer is admitted into contact with the polymer dispersion. This will serve to illustrate the method. Obviously, continuous production of stabilized polymer may be obtained without rigidly adhering to the particular scheme described. The present invention therefore is not limited to this exact method for continuous operation.

It is also possible to incorporate the antioxidant, for example, phenyl-beta-naphthylamine continuously in like manner, if an antioxidant is to be added. As disclosed above, the preferred procedure includes the addition of an antioxidant. The antioxidant may be added continuously, either as a separate stream as disclosed in the applications describing modified polymerization or it may be included in the same stream in which the stabilizer is included and, in fact, this latter variation has been found to be very convenient.

The uses of the heat curable plastic polymer stabilized according to this invention are the same as those disclosed in the copending applications, above referred to, which disclose the modified polymerization and the advantages of the present invention are apparent from the above description. The compositions produced by the process of this invention are novel as well as useful. These plastic polymer compositions possess the novel property of remaining in the plastic state for much longer periods than any previously known compositions of such polymers, but are substantially as readily converted under curing conditions to highly elastic products as they would be if the polymers had not been treated with a stabilizer as described herein. The stabilized polymers exhibit a greatly reduced tendency to lose their plasticity on storage under ordinary conditions for periods substantially in excess of three months or in the accelerated aging test at 70° C. for periods in excess of 24 hours.

It is apparent that many widely different embodiments of this invention may be made without departing from the spirit and scope thereof, and, therefore, it is not intended to be limited except as indicated in the appended claims.

I claim:

1. A composition comprising a heat curable plastic polymer of a compound of the general formula $$CH_2=C-C=CH_2$$
$$\phantom{CH_2=}|\phantom{C-C=}|$$
$$\phantom{CH_2=C}X\phantom{-C=}R$$

in which R is a member of the group consisting of hydrogen and hydrocarbon radicals, and X is halogen having, in chemical combination therewith, an unpolymerizable, acid-stable organic modifying agent which is capable of forming an addition product with compounds of the above general formula under conditions of polymerization of compounds of the above general formula, and also comprising a small amount of a mercaptan of the general formula Q—SH in which the —SH group is attached directly to one of the carbon atoms in the Q group and in which Q is an organic group selected from the class consisting of aryl groups and aralkyl groups, which aryl groups and aralkyl groups consist of carbon and inorganic radicals selected from the class consisting of —H, —Cl, —Br, —I, —NO_2, and —SO_3M, in which M is an inorganic radical of the group consisting of hydrogen and alkali metals.

2. A composition as described in claim 1, further characterized in that the compound of the general formula $$CH_2=C-C=CH_2$$
$$\phantom{CH_2=}|\phantom{C-C=}|$$
$$\phantom{CH_2=C}X\phantom{-C=}R$$

is chloro-2-butadiene-1,3.

3. The process which comprises incorporating into a heat curable plastic polymer of a compound of the general formula $$CH_2=C-C=CH_2$$
$$\phantom{CH_2=}|\phantom{C-C=}|$$
$$\phantom{CH_2=C}X\phantom{-C=}R$$

in which X is halogen and R is a member of the group consisting of hydrogen or a hydrocarbon radical having, in chemical combination therewith, an unpolymerizable, acid-stable organic modifying agent which is capable of forming an addition product with compounds of the above general formula under conditions of polymerization of compounds of the above general formula, a small amount of a mercaptan of the general formula Q—SH in which the —SH group is attached directly to one of the carbon atoms in the Q group and in which Q is an organic group selected from the class consisting of aryl groups and aralkyl groups, which aryl groups and aralkyl groups consist of carbon and inorganic radicals selected from the class consisting of —H, —Cl, —Br, —I, —NO_2, and —SO_3M, in which M is an inorganic radical of the group consisting of hydrogen and alkali metals.

4. The process of claim 3, further characterized in that the compound of the general formula $$CH_2=C-C=CH_2$$
$$\phantom{CH_2=}|\phantom{C-C=}|$$
$$\phantom{CH_2=C}X\phantom{-C=}R$$

is chloro-2-butadiene-1,3.

5. The process which comprises dispersing about 100 parts by weight of chloro-2-butadiene-1,3 in about 300 to 400 parts by weight of an acid aqueous medium and polymerizing the dispersed chloro-2-butadiene-1,3 in the presence of 0.75 parts by weight of thioglycolic acid and 0.06 parts by weight of hydrogen sulfide and then when about 80% of the chloro-2-butadiene-1,3 has polymerized, adding a dispersion of about 1 part by weight of phenyl-beta-naphthylamine and about 2 parts by weight of para-nitro-thiophenol dissolved in about 10 parts by weight of benzene and dispersed in about 13 parts by weight of a 1% solution of stearyl sodium sulfate and coagulating, washing, and drying the polymerized chloro-2-butadiene-1,3.

6. A composition as described in claim 1 further characterized in that the compound of the general formula $$CH_2=C-C=CH_2$$
$$\phantom{CH_2=}|\phantom{C-C=}|$$
$$\phantom{CH_2=C}X\phantom{-C=}R$$

is chloro-2-butadiene-1,3, the mercaptan is thio-beta-naphthol and there is also present phenyl-beta-naphthyl-amine.

7. A composition as described in claim 1 further characterized in that the compound of the general formula $$CH_2=C-C=CH_2$$
$$\phantom{CH_2=}|\phantom{C-C=}|$$
$$\phantom{CH_2=C}X\phantom{-C=}R$$

is chloro-2-butadiene-1,3, the mercaptan is nitro-thiophenol and there is also present phenyl-beta-naphthyl-amine.

8. The process which comprises dispersing chloro-2-butadiene-1,3 in an acid aqueous medium, polymerizing the dispersed chloro-2-butadiene-1,3 in the presence of a small amount of thioglycolic acid and a small amount of hydrogen sulfide, and adding a small amount of phenyl-beta-naphthylamine and a small amount of para-nitro-thiophenol to the resulting dispersion.

HERBERT W. WALKER.